(12) United States Patent
Paramesh et al.

(10) Patent No.: US 12,045,494 B2
(45) Date of Patent: Jul. 23, 2024

(54) AER AND AEN FOR OVERLAPPING CROSS FEATURE

(71) Applicant: Western Digital Technologies, Inc., San Jose, CA (US)

(72) Inventors: Pradeep Bandammanavar Paramesh, Shivamogga (IN); Muthukumar Karuppiah, Tracy, CA (US)

(73) Assignee: Sandisk Technologies, Inc., Austin, TX (US)

( * ) Notice: Subject to any disclaimer, the term of this patent is extended or adjusted under 35 U.S.C. 154(b) by 146 days.

(21) Appl. No.: 17/956,780

(22) Filed: Sep. 29, 2022

(65) Prior Publication Data
US 2024/0111446 A1    Apr. 4, 2024

(51) Int. Cl.
*G06F 11/00* (2006.01)
*G06F 3/06* (2006.01)
*G06F 11/22* (2006.01)
*G06F 11/30* (2006.01)

(52) U.S. Cl.
CPC .......... *G06F 3/0653* (2013.01); *G06F 3/0604* (2013.01); *G06F 3/0679* (2013.01); *G06F 11/2247* (2013.01); *G06F 11/2284* (2013.01); *G06F 11/3037* (2013.01)

(58) Field of Classification Search
CPC ............. G06F 11/2247; G06F 11/2284; G06F 11/3037; G06F 3/0653
See application file for complete search history.

(56) References Cited

U.S. PATENT DOCUMENTS

| 8,966,319 B2 * | 2/2015 | Fai ........................ G06F 11/362 |
| | | 714/42 |
| 9,996,477 B2 | 6/2018 | Chan et al. |
| 11,182,232 B2 | 11/2021 | Ozturk et al. |
| 2013/0262073 A1 * | 10/2013 | Asaad ..................... G06F 9/455 |
| | | 703/14 |
| 2015/0082325 A1 * | 3/2015 | Aharonov ............. G06F 9/4825 |
| | | 719/318 |
| 2015/0137839 A1 * | 5/2015 | Jones ............... G01R 31/31907 |
| | | 324/750.01 |
| 2015/0177994 A1 * | 6/2015 | Vucinic ................... G06F 12/08 |
| | | 711/103 |
| 2016/0365155 A1 * | 12/2016 | Kim .................... G06F 13/4022 |
| 2018/0074973 A1 * | 3/2018 | Chan ....................... G06F 11/00 |
| 2019/0129774 A1 | 5/2019 | Konan et al. |
| 2019/0155765 A1 * | 5/2019 | Lee ..................... G06F 12/0238 |

(Continued)

FOREIGN PATENT DOCUMENTS

TW        202145239 A    12/2021

*Primary Examiner* — Elmira Mehrmanesh
(74) *Attorney, Agent, or Firm* — PATTERSON + SHERIDAN, LLP

(57) ABSTRACT

The present disclosure generally relates to validating memory devices. Rather than using debug hardware (HW) to consume, record, and decode firmware (FW) events, standard non-volatile memory express (NVMe) asynchronous event request (AER) and NVMe asynchronous event notification (AEN) is used. The NVMe AER results in initiating a particular function to be performed by a device under test (DUT) and triggering a cross feature (CF) that should at least partially overlap in time with the particular function. Using NVMe AER and AEN will eliminate the need for debug HW, reduce FW custom logic, and reduce latency.

18 Claims, 10 Drawing Sheets

(56) References Cited

U.S. PATENT DOCUMENTS

| | | | |
|---|---|---|---|
| 2019/0259465 A1* | 5/2019 | Subramanian | G11C 29/38 |
| 2020/0097422 A1* | 3/2020 | Benisty | G06F 13/1668 |
| 2020/0364339 A1* | 11/2020 | Chao | G06F 21/57 |
| 2021/0149757 A1* | 5/2021 | Ozturk | G06F 11/0796 |
| 2021/0200661 A1 | 7/2021 | Karuppiah et al. | |
| 2021/0216220 A1* | 7/2021 | Kim | G06F 3/0656 |
| 2021/0303430 A1* | 9/2021 | Yuan | G06F 11/2733 |
| 2021/0357311 A1* | 11/2021 | Mendes | G06F 11/3648 |
| 2021/0390022 A1* | 12/2021 | Siluvainathan | G06F 3/0658 |
| 2022/0197833 A1* | 6/2022 | Steinmetz | G06F 13/1668 |

\* cited by examiner

AER AND AEN FOR OVERLAPPING CROSS FEATURE

BACKGROUND OF THE DISCLOSURE

Field of the Disclosure

Embodiments of the present disclosure generally relate to validating memory devices.

Description of the Related Art

In a memory device validation environment, such as a SSD validation environment, the ability to deterministically trigger a cross feature (CF) on a specific firmware (FW) event is utilized in test coverage. The determinism provides higher probability of coverage and confidence for the validation owners, which allows the validation to trigger different combinations and permutations deterministically.

There are different ways of achieving the deterministic protocol CF. Many currently rely on platforms with debug hardware (HW). One example is the Next Unit of Computing (NUC) platform with debug HW. The debug HW detects the specific event and a general purpose input/output (GPIO) driver triggers the CF. Field programmable gate array (FPGA) test logic used with debug HW is another example. Debug HW detects the specific event, and the FPGA test logic triggers the CF.

In general the existing environments of deterministic CF require FW that streams the FW events and debug HW to record the FW events. Dedicated HW, such as a NUC platform that monitors the FW event via GPIO, is also typically required to inject the specific CF. In operation, due to the FW and dedicated HW, there will be some constant delay between the specific event and the CF triggered, and it is ideal to have the constant delay to be a few microseconds (i.e., less than 10 microseconds). In current test infrastructures, the need for debug HW is mandatory.

Therefore, there is a need in the art for an improved validation procedure for memory devices by reducing overall infrastructure (debug HW) dependency by reducing the cost and implementation challenges.

SUMMARY OF THE DISCLOSURE

The present disclosure generally relates to validating memory devices. Rather than using debug hardware (HW) to consume, record, and decode firmware (FW) events, standard non-volatile memory express (NVMe) asynchronous event request (AER) and NVMe asynchronous event notification (AEN) is used. The NVMe AER shall initiate a particular function (monitoring FW events) to be performed by a device under test (DUT). DUT shall respond the NVMe-AER with AEN indicating the occurrence of the configured FW event. This in turn shall be monitored by Test platform and inject a cross feature (CF) that should at least partially overlap in time with the particular function. Using NVMe AER and AEN will eliminate the need for debug HW, reduce FW custom logic, and reduce latency.

In one embodiment, a testing system comprises: one or more processing devices configured to: initialize a device under test (DUT); deliver a non-volatile memory express (NVMe) asynchronous event request (AER) to a driver, wherein the NVMe AER includes instructions for the DUT to perform a particular function; receive a NVMe asynchronous event notification (AEN) from the DUT; and initiate execution of a cross feature (CF), wherein the CF is a secondary function that is secondary to the particular function, and whereby the CF is executed while the DUT is performing the particular function.

In another embodiment, a method of validating a memory device comprises: initializing a device under test (DUT); snooping command completion notifications from the DUT; delivering a non-volatile memory express (NVMe) asynchronous event request (AER) to a driver, wherein the NVMe AER includes instructions for the DUT to perform a particular function; and receiving an NVMe asynchronous event notification (AEN) from the DUT.

In another embodiment, a testing device comprises: means to initialize a device under test (DUT) and initiate non-volatile memory express (NVMe) asynchronous event request (AER) for the DUT to perform a particular function; and a driver configured to deliver the NVMe AER to the DUT, wherein either the driver or field programmable gate array (FPGA) test logic is configured to initiate execution of a cross feature (CF) by the DUT, wherein the initiation occurs prior to completion of the particular function.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to validating memory devices. Rather than using debug hardware (HW) to consume, record, and decode firmware (FW) events, standard non-volatile memory express (NVMe) asynchronous event request (AER) and NVMe asynchronous event notification (AEN) is used. The NVMe AER shall initiate a particular function (monitoring FW events) to be performed by a device under test (DUT). DUT shall respond the NVMe-AER with AEN indicating the occurrence of the configured FW event. This in turn shall be monitored by Test platform and inject a cross feature (CF) that should at least partially overlap in time with the particular function. Using NVMe AER and AEN will eliminate the need for debug HW, reduce FW custom logic, and reduce latency.

Figure 1:
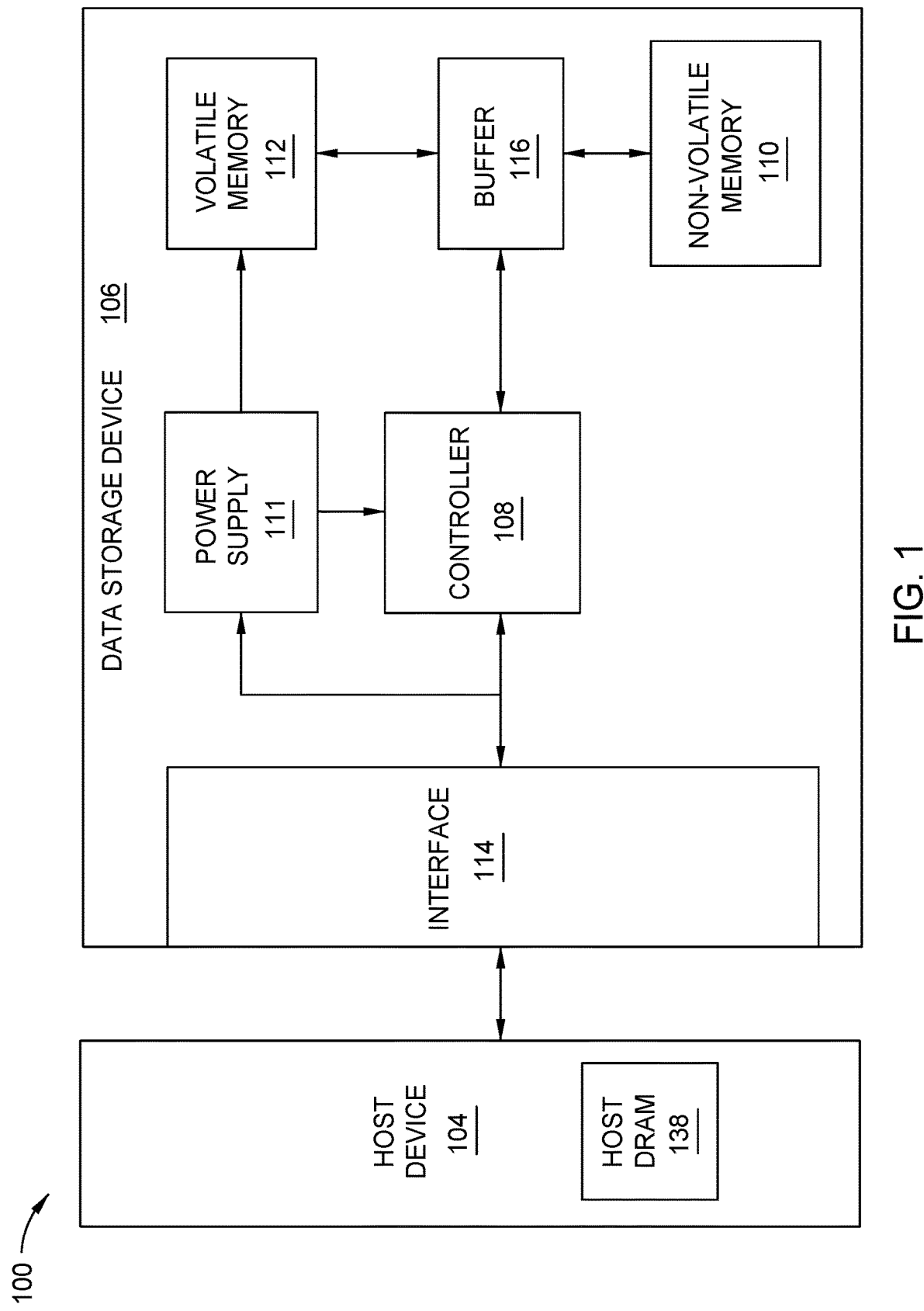
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108 (i.e., a second volatile memory 150), which may be SRAM memory, prior to sending the data to the NVM 110.

Figure 2:
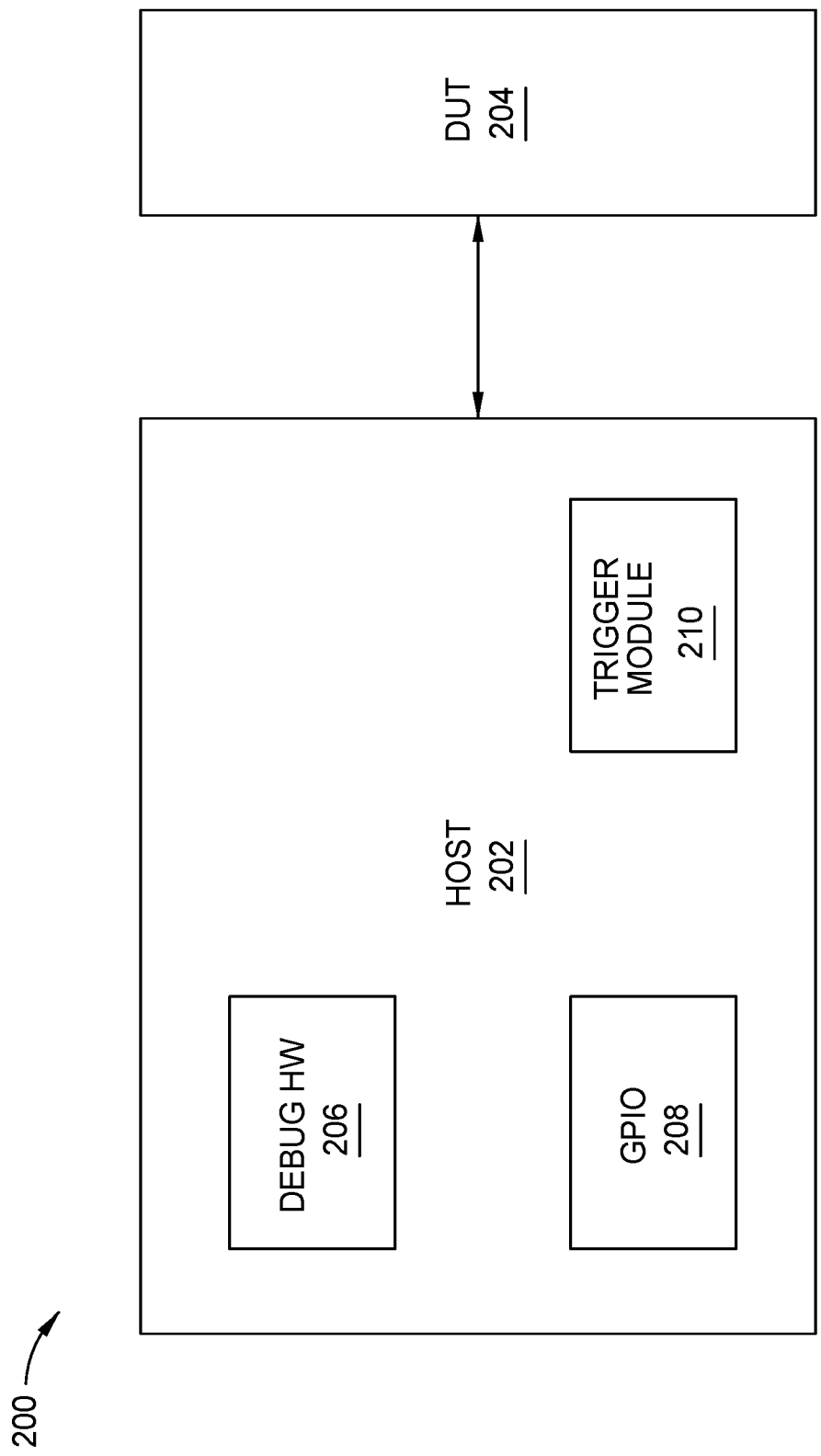
FIG. 2 is a schematic block diagram illustrating a testing system.

FIG. 2 is a schematic block diagram illustrating a testing system 200. In FIG. 2, the testing system 200 includes a host 202 coupled to a device under test (DUT) 204 such as a solid state drive (SSD). An example of a host 202 is a laptop computer or a desktop computer. The host 202 has dedicated debug HW 206 that is configured to consume, record and decode FW events. The same debug HW 206 toggles a general purpose input/output (GPIO) driver 208 which in turn is detected by a CF trigger module 210. The CF trigger module 210 may be either: software (SW) based or HW based. In the case of SW based, the GPIO driver 208 at host 202 may function as the trigger module 210. For HW based, a field programmable gate array (FPGA) tester may be used. As the trigger module 210 may be either SW or HW, both the GPIO driver 208 and a distinct trigger module 210 are shown in FIG. 2. Responsibility of the trigger module 210 is to trigger the configured CF, after the GPIO driver 208 toggle is detected.

Figure 3:
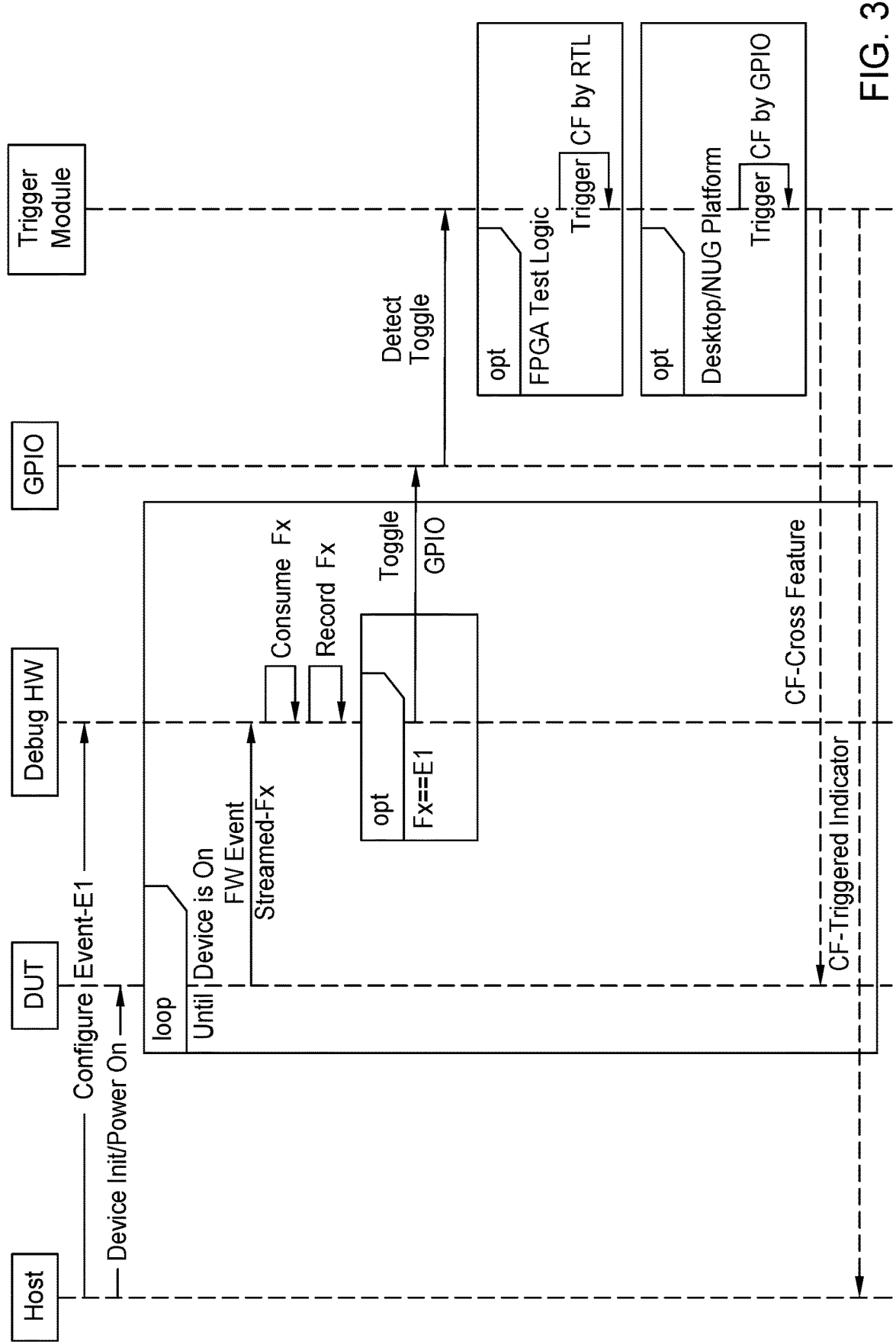
FIG. 3 is a schematic sequence diagram for device testing.
Figure 4:
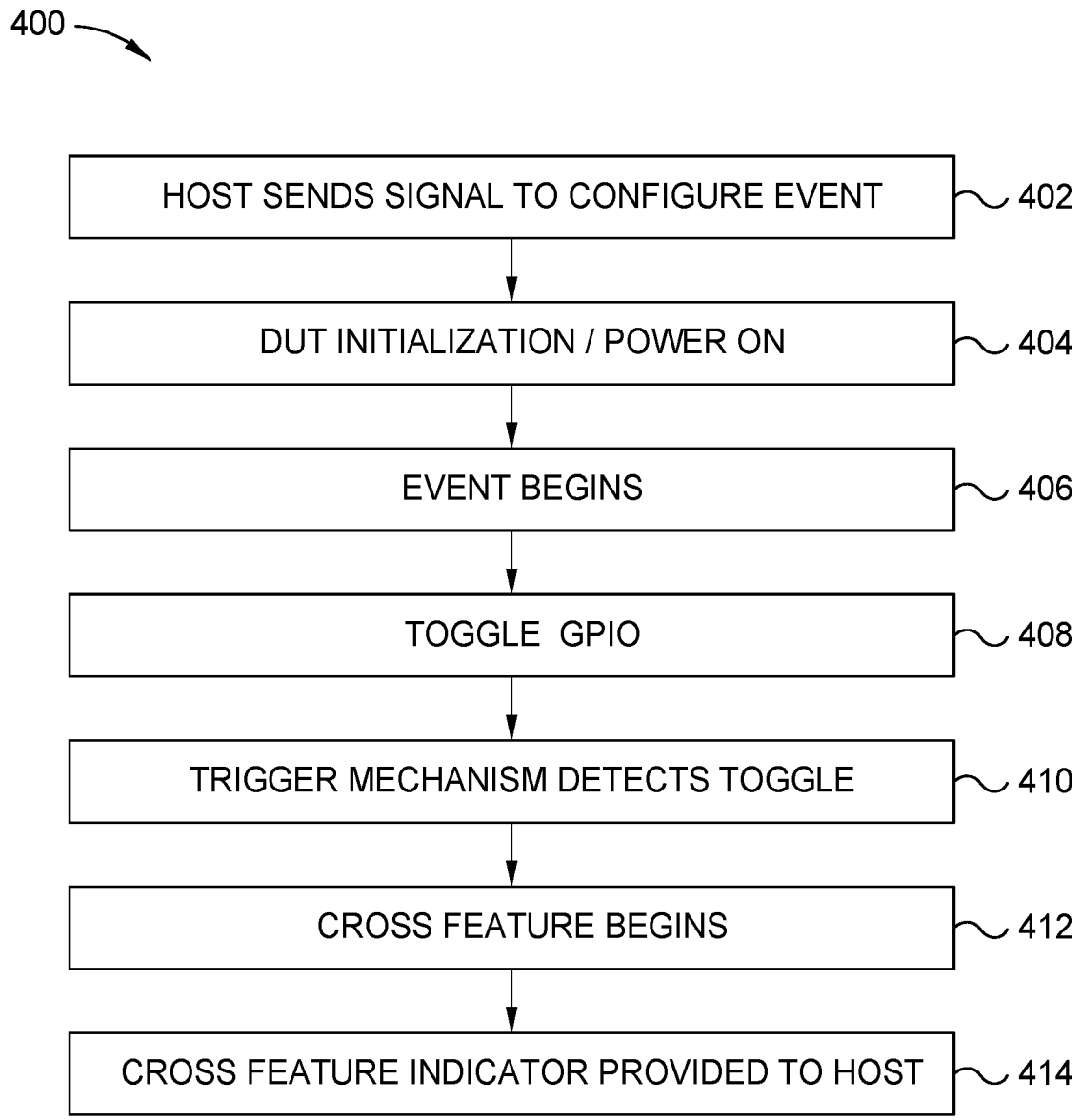
FIG. 4 is a flowchart illustrating a device testing sequence.

FIG. 3 is a schematic sequence diagram for device testing. FIG. 4 is a flowchart 400 illustrating a device testing sequence. FIGS. 3 and 4 will be described together. Initially, the host configures the FW event (expected) in the debug HW at 402 to monitor the FW event. Additionally, the host initializes/powers on the DUT at 404. At this point in time, the DUT is powered on and a loop begins. In the loop, the FW event begins at 406 and is streamed from the DUT to the debug HW which consumes and records the FW event. As soon as the configured FW event detected, the GPIO is toggled by debug HW at 408, and the trigger mechanism detects the toggle at 410. Now that the trigger mechanism has detected the toggle, the CF begins either by initiation from the GPIO Driver or register transfer logic (RTL) in FPGA at 412. The CF trigger indicator is then provided to the host at 414.

There are downsides to device testing as described above. In particular, there may be a significant delay between initiation of the FW event and initiations of the CF. In some cases, the FW event may have completed prior to initiation of the CF. Thus, in such a scenario, the testing really did not occur and the DUT would need to be tested again. Additionally, the delays and HW increase costs for manufacturing. As will be discussed below, utilizing administrative commands based upon the NVMe specification result in significant cost savings.

In the NVMe specification, asynchronous event requests (AER) are administrative commands used by a host device to inquire about status information, error information, health information, and other administrative information of a data storage device, such as a SSD. The AER is submitted by the host to enable reporting of asynchronous events from the controller of the data storage device. The AER has no timeout. The response to an AER is an asynchronous event notification (AEN). The AEN is used to notify the host device of the status information, error information, health information, or other requested information of the data storage device, SSD, or DUT. The controller of the data storage device posts a completion queue entry for the NVMe AER command when there is an asynchronous event to be reported to the host.

As will be discussed herein, the NVMe AER command and corresponding AEN response is a viable tool that can be used to ensure that the CF will be initiated earlier and thus overlap in time with the FW event. For example, for a FW event such as garbage collection (GC), a CF, such as Read/Write/Format, compaction, error handling, and erase functions can be initiated. Using the existing tools of NVMe AER and AEN eliminates the need for debug HW and leverages the speed and timing of the NVMe specification. As discussed below, an NVMe driver perform workload to induce the FW event and enable the CF in the DUT. The NVMe driver initiates the CF upon receipt of the NVMe AEN for specific FW Event registered through NVMe AER. Because the AEN is immediately prepared upon initiation of the FW event and then sent, the delay for beginning the CF is minimal which should ensure the FW event and CF overlap in execution and thus provide effective testing of the data storage device.

Figure 5:
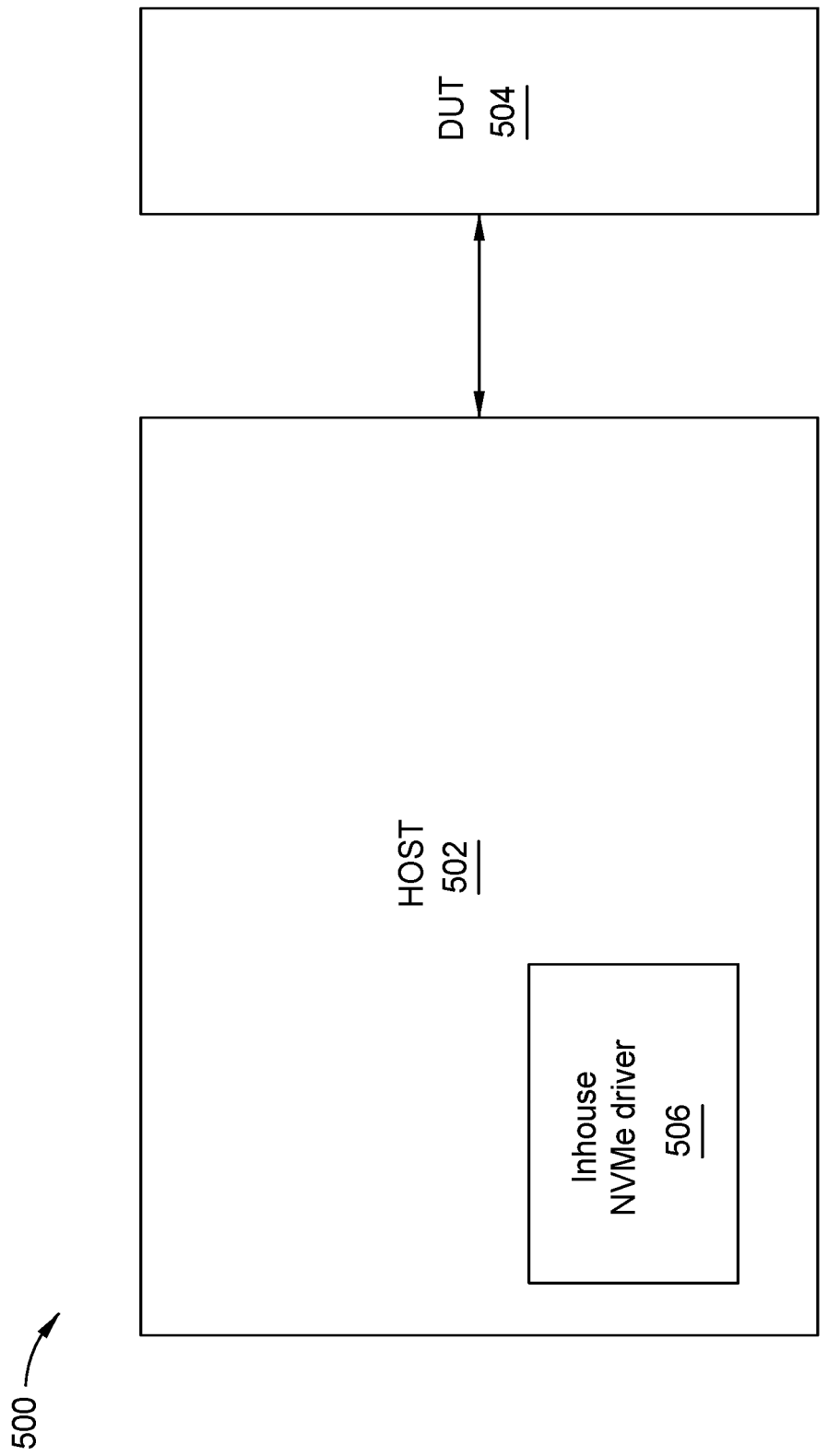
FIG. 5 is a schematic block diagram illustrating a testing system according to one embodiment.
Figure 6:
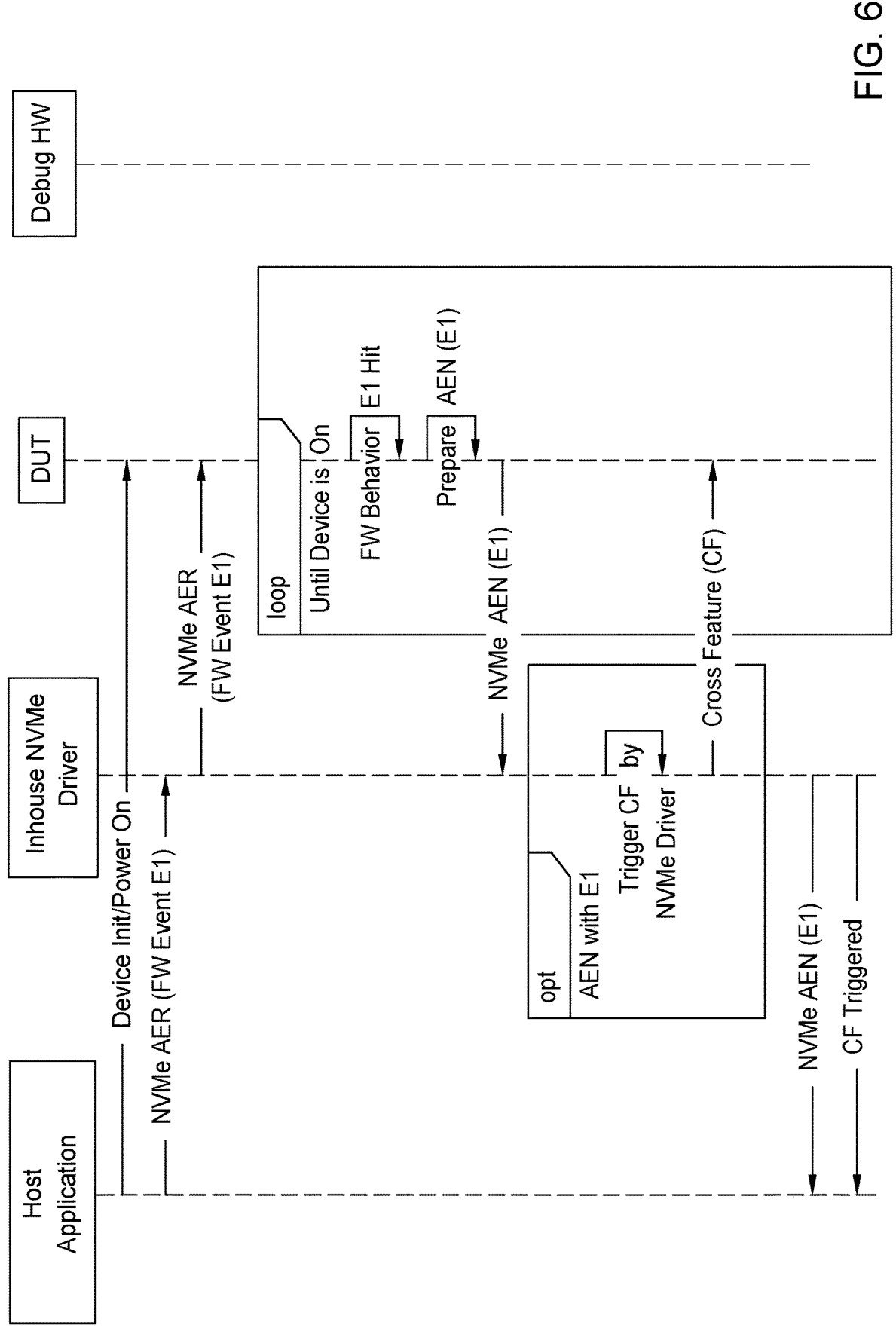
FIG. 6 is a schematic sequence diagram for device testing according to one embodiment.
Figure 7:
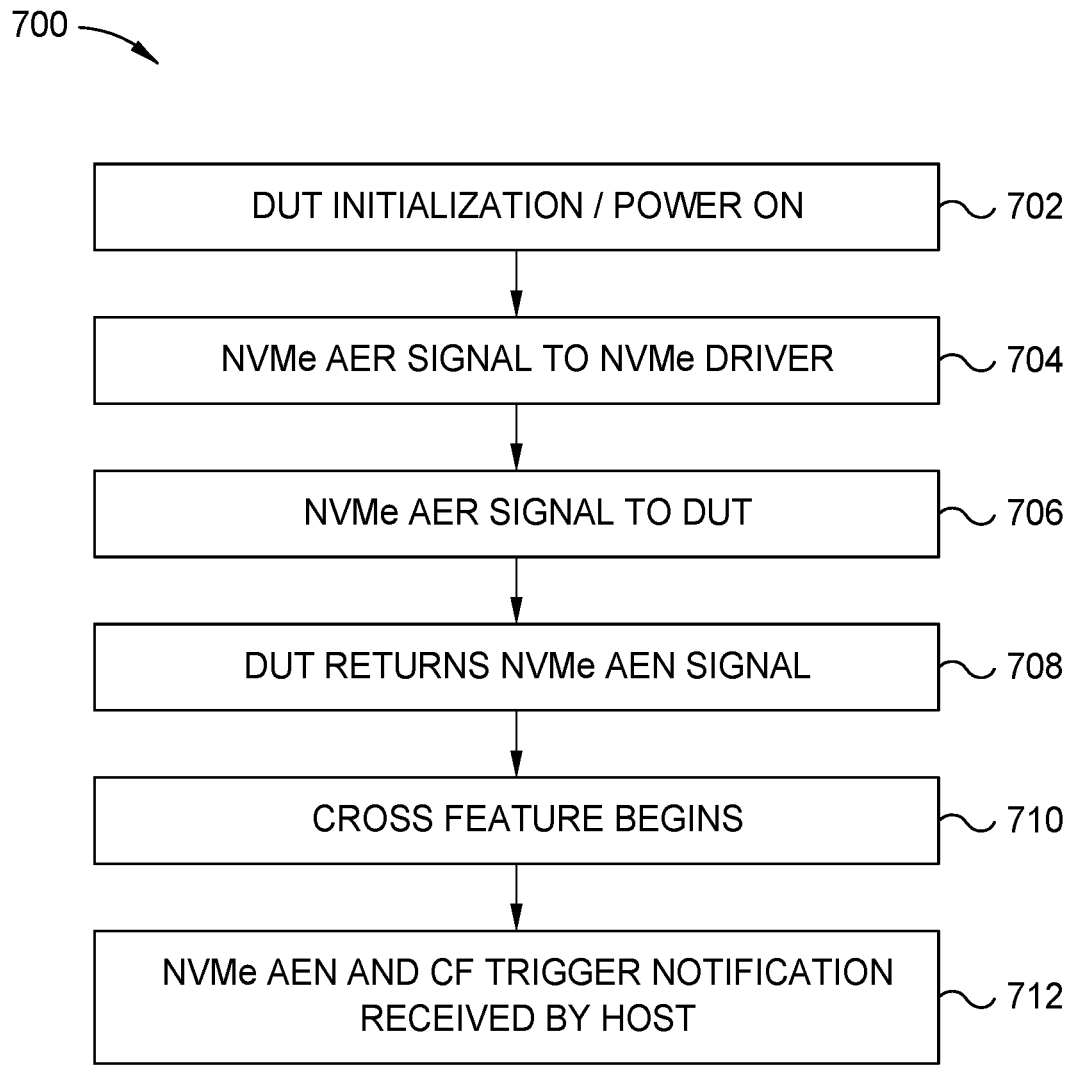
FIG. 7 is a flowchart illustrating a device testing sequence according to one embodiment.

FIG. 5 is a schematic block diagram illustrating a testing system 500 according to one embodiment. The testing system 500 includes a host 502, DUT 504, and an NVMe driver 506. FIG. 6 is a schematic sequence diagram for device testing according to one embodiment. FIG. 7 is a flowchart 700 illustrating a device testing sequence according to one embodiment. FIGS. 5-7 will be discussed together. In the approach of FIGS. 5-7, there is no need of debug HW or FGPA test logic. Rather, the testing system 500 uses standard NVMe AER and AEN as discussed above which will ensure faster testing and overlap of the FW event and CF. The testing system simply needs a suitably configured FW to respond for the configured, set event whenever the event happens at the FW. Host NVMe Driver initiates the CF and the CF is performed at the DUT.

As shown in FIGS. 6 and 7 in particular, when the configured event E1 (also known as the FW event) occurs, the NVMe AER is responded to with the NVMe AEN by the FW (i.e., the suitably configured FW). The NVMe AEN is sent to the NVMe driver, which acts as the trigger module to trigger the configured CF. The NVMe driver also passes the NVMe AEN to the host application. More specifically, the host powers on the DUT at 702 and then sends the NVMe AER command to the NVMe driver at 704 which then sends the NVMe AER command to the DUT at 706. At this point the host continues to perform the workload, and as part of workload processing the DUT begins to execute the FW event-E1 and prepares the NVMe AEN to be sent back to the host. The DUT then sends the prepared NVMe AEN to the NVMe driver at 708. Receipt of the NVMe AEN at the NVMe driver triggers the NVMe driver to initiate the CF in the DUT such that the CF begins in the DUT at 710. The NVMe driver sends the NVMe AEN and notification of the CF triggering to the host application at 712.

Because the NVMe AER command and AEN response are used, the delays due to testing should be reduced compared to the methodology discussed above with regards to FIGS. 2-4. The delays that may occur during the testing are due to: (a) FW time to prepare for a completion response (i.e., AEN response to AER); (b) one transfer layer packet (TLP) of PCIe memory write by the DUT with four double words (DW; also known as dwords) for completion of the AEN; (c) message signaled interrupts (MSI) or MSIx interrupt handling at the host; and (d) one TLP of PCIe memory write by host for ringing the doorbell for the CF trigger. Due to not having debug HW, less delays should be present as compared to the embodiment discussed in FIGS. 2-4.

Figure 8:
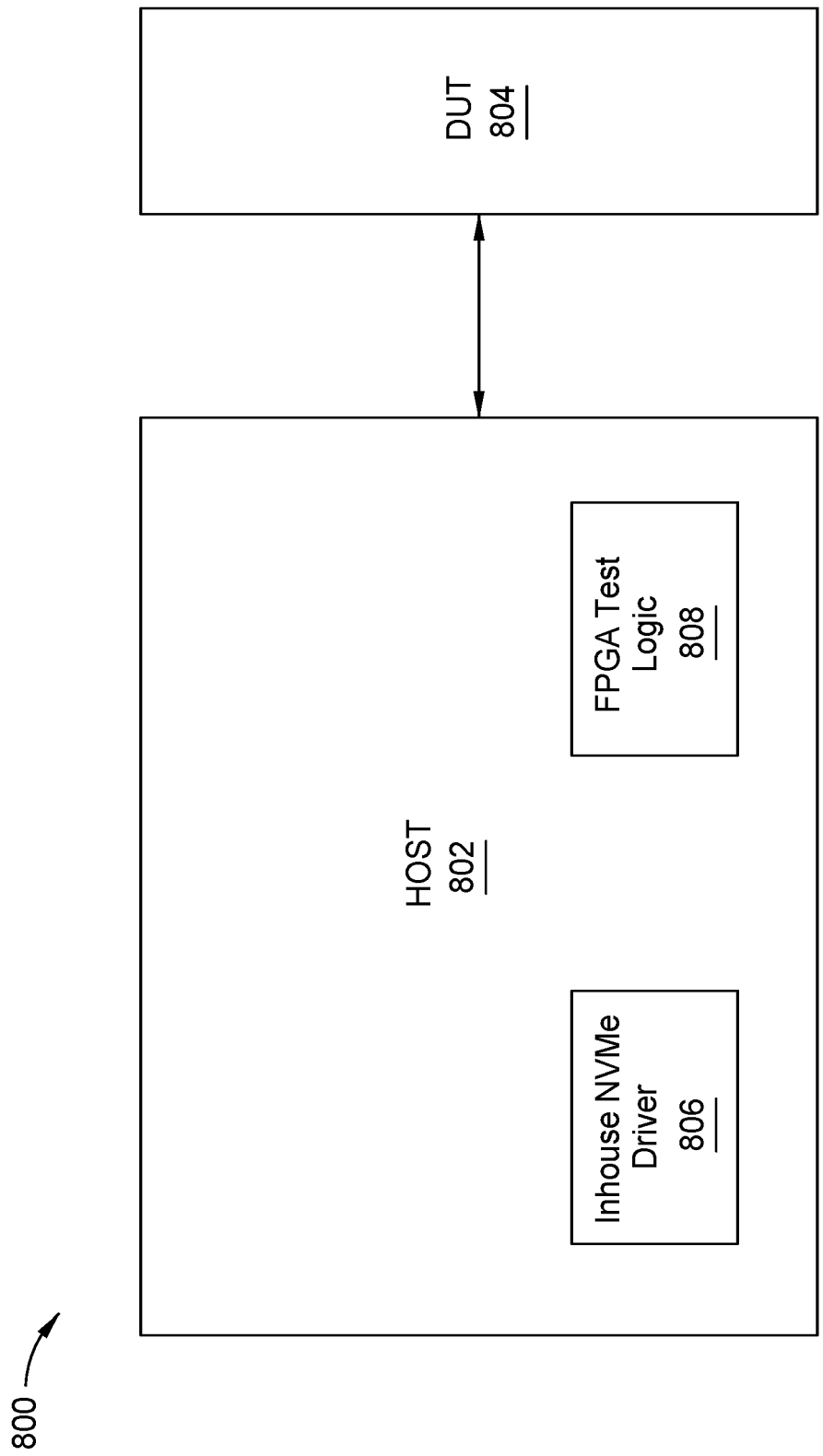
FIG. 8 is a schematic block diagram illustrating a testing system according to another embodiment.
Figure 9:
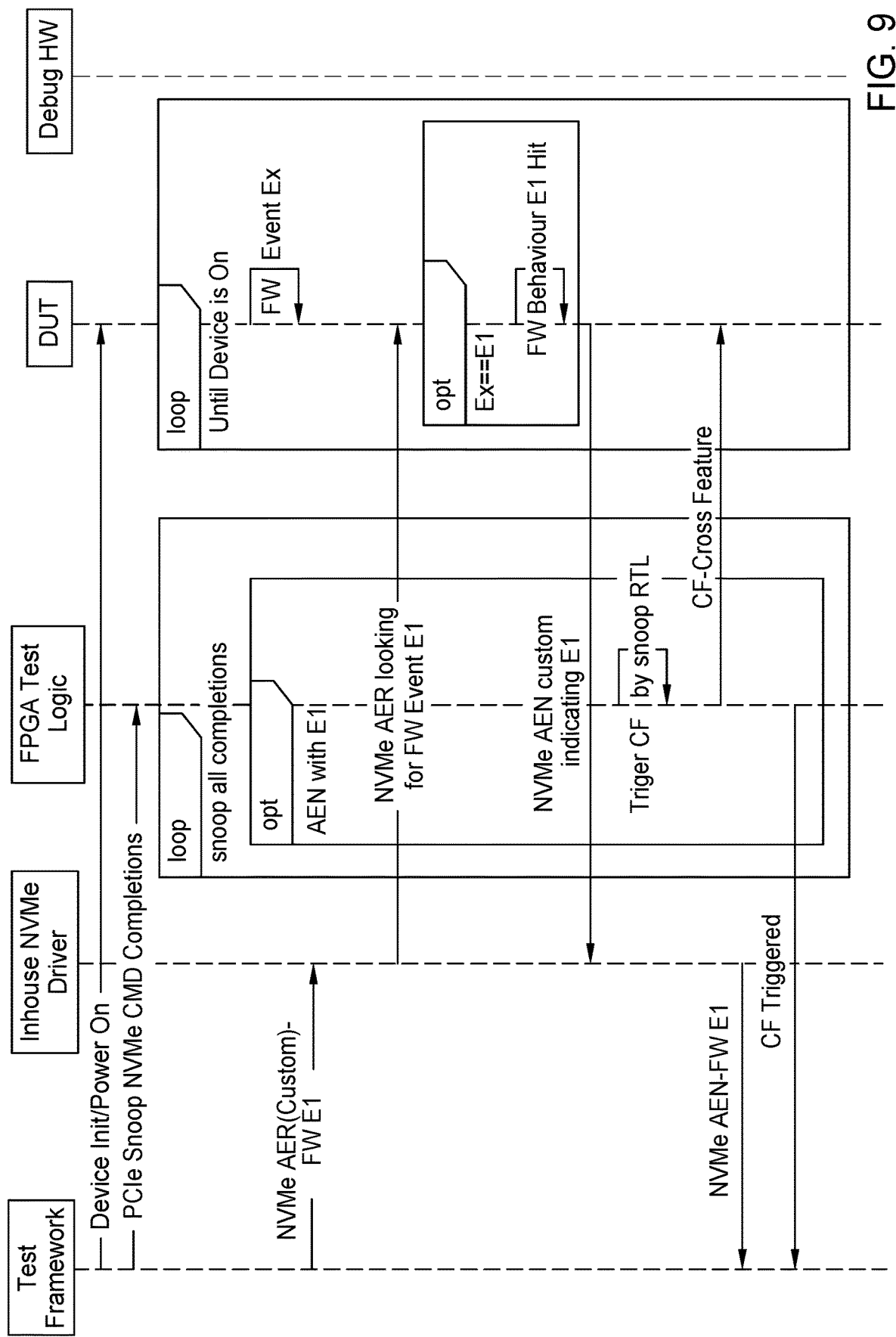
FIG. 9 is a schematic sequence diagram for device testing according to another embodiment.
Figure 10:
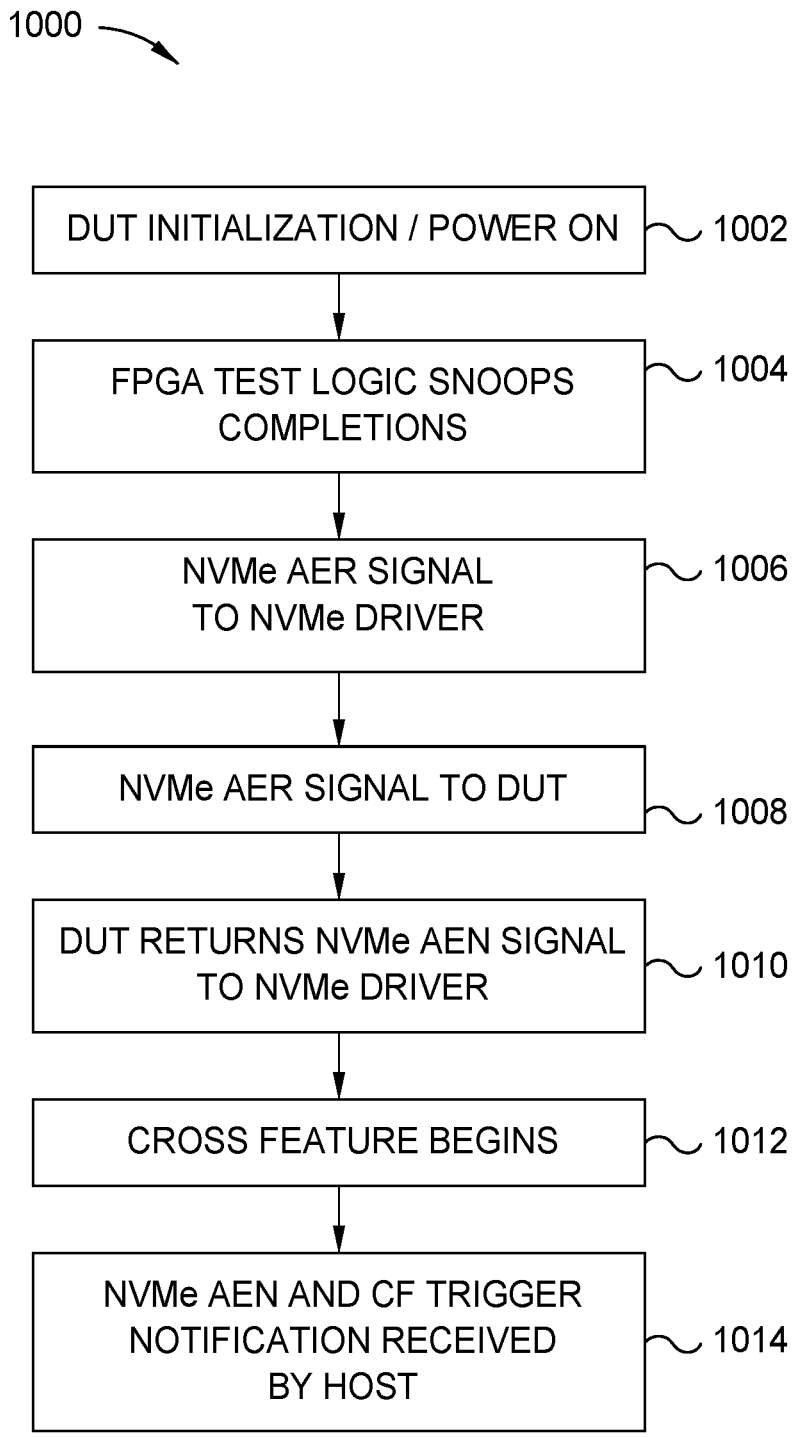
FIG. 10 is a flowchart illustrating a device testing sequence according to another embodiment.

It is contemplated that FPGA test logic may even further reduce delays. FIG. 8 is a schematic block diagram illustrating a testing system 800 according to another embodiment. FIG. 9 is a schematic sequence diagram for device testing according to another embodiment. FIG. 10 is a flowchart 1000 illustrating a device testing sequence according to another embodiment. FIGS. 8-10 will be discussed together.

Similar to FIG. 5, the testing system 800 includes a host 802, DUT 804, NVMe driver 806, and also FPGA test logic 808. Testing system 800, like testing system 500, does not utilize debug HW. Rather, testing system 800 utilizes FPGA test logic 808. The approach in FIGS. 8-10 will follow standard NVMe AER command behavior as per the NVMe specification (i.e., both AER and AEN will be used). A suitably configured FW as discussed above will respond for the configured set event whenever the event happens at the FW. When the configured event occurs, the NVMe AER is responded to with the NVMe AEN by the FW. NVMe AEN detection in this case shall happen at the FPGA test logic 808, which acts as the trigger module to trigger the configured CF.

As shown in FIGS. 9 and 10 in particular, when the configured event E1 (also known as the FW event) occurs, the NVMe AER is responded to with the NVMe AEN by the FW (i.e., the suitably configured FW). The NVMe AEN is sent to the NVMe driver, which acts as the trigger module to trigger the configured CF. The NVMe driver also passes the NVMe AEN to the host application. The FPGA test logic, however, snoops the completions and hence knows in advance what commands are completed and eliminate MSI or MSIx interrupt handling at the host.

More specifically, the host powers on the DUT at 1002 and the FPGA test logic snoops the completions for the DUT at 1004. The host then sends the NVMe AER command to the NVMe driver at 1006 which then sends the NVMe AER command to the DUT at 1008. At this point the DUT begins performing the FW event and prepares the NVMe AEN to be sent back to the NVMe driver. The DUT then sends the prepared NVMe AEN to the NVMe driver at 1010. Because of the snooping, the FPGA test logic, upon seeing the NVMe AEN response from the DUT, triggers initiation of the CF in the DUT such that the CF begins in the DUT at 1012. The NVMe driver sends the NVMe AEN response to the host and the FPGA test logic informs the host that the CF has been initiated at 1014. Hence, the FPGA test logic triggers the CF prior to the host or the NVMe driver receiving the AEN, which is earlier than in the embodiment in FIGS. 5-7 where the NVMe driver receives the NVMe AEN response prior to triggering the CF.

Due to the FPGA test logic, less delays should be present as compared to FIGS. 5-7. The delays that may occur during the testing are due to: (a) FW time to prepare for a completion response (i.e., AEN response to AER); (b) one transfer layer packet (TLP) of PCIe memory write by the DUT with four dwords (DW) for completion of the AEN; and (c) one TLP of PCIe memory write by host for ringing the doorbell for the CF trigger. Notable, there is no MSI or MSIx interrupt handling at the host and thus, no delays from such interrupt handling.

By using NVMe AER and AEN, use of debug HW in a host testing system is not needed and all transactions will happen in band which reduces FW logic (debug logging). The CF is an in band deterministic protocol CF used in NVMe storage access and transport protocol of the PCIe interface standard. Any regular testing platform may be used to validate Deterministic Protocol Cross Features (DPCF). Very minimal host CPU cycles may be used by NVMe driver to detect the AEN and trigger the CF. The CF buffer allocation and payload can be made available during the setup and consumed at AEN detection. The approach discussed herein results in lower latency and higher determinism as the host operating system (OS) may not be involved.

In one embodiment, a testing system comprises: one or more processing devices configured to: initialize a device under test (DUT); deliver a non-volatile memory express (NVMe) asynchronous event request (AER) to a driver, wherein the NVMe AER includes instructions for the DUT to perform a particular function; receive a NVMe asynchronous event notification (AEN) from the DUT; and initiate execution of a cross feature (CF), wherein the CF is a secondary function that is secondary to the particular function, and whereby the CF is executed while the DUT is performing the particular function. The driver is configured to initiate execution of the CF. The receiving occurs at the driver. The driver is further configured to send the NVMe AEN to a testing application of the testing system. The testing system receives the NVMe AEN after the initiating. The CF comprises read/write/format, compaction, error handling, or erase functions. The driver is configured to deliver the NVMe AER to the DUT. The testing system further comprises a field programmable gate array (FPGA) test logic that initiate execution the CF. One or more processing devices are further configured to receive the AEN from the DUT without debug hardware.

In another embodiment, a method of validating a memory device comprises: initializing a device under test (DUT); snooping command completion notifications from the DUT; delivering a non-volatile memory express (NVMe) asynchronous event request (AER) to a driver, wherein the NVMe AER includes instructions for the DUT to perform a particular function; and receiving an NVMe asynchronous event notification (AEN) from the DUT. The method further comprises initiating execution of a cross feature (CF), wherein the CF is a secondary function, and wherein the CF is executed while the DUT is performing the particular function. The snooping is performed by a field programmable gate array (FPGA) test logic. The FPGA test logic triggers execution of a cross feature (CF) by the DUT. The FPGA test logic initiates execution of a cross feature (CF) and informs a host that the CF has been triggered. The CF trigger occurs without message signaled interrupts (MSI) or MSIx handling at a host. The driver receives the NVMe AEN and provides the NVMe AEN to a host. The driver receives the NVMe AER and provides the NVMe AER to the DUT.

In another embodiment, a testing device comprises: means to initialize a device under test (DUT) and initiate non-volatile memory express (NVMe) asynchronous event request (AER) for the DUT to perform a particular function; and a driver configured to deliver the NVMe AER to the DUT, wherein either the driver or field programmable gate array (FPGA) test logic is configured to initiate execution of a cross feature (CF) by the DUT, wherein the initiation occurs prior to completion of the particular function. The means to initialize is configured to receive an NVMe asynchronous event notification (AEN) from the DUT and wherein the means to initialize is configured to receive the NVMe AEN after the initiation. The driver is further configured to deliver the NVMe AEN to the means to initialize.

While the foregoing is directed to embodiments of the present disclosure, other and further embodiments of the disclosure may be devised without departing from the basic scope thereof, and the scope thereof is determined by the claims that follow.

What is claimed is:

1. A testing system, comprising:
one or more processing devices configured to:
initialize a device under test (DUT);
deliver a non-volatile memory express (NVMe) asynchronous event request (AER) to a driver, wherein the NVMe AER includes instructions for the DUT to perform a particular function;
receive a NVMe asynchronous event notification (AEN) from the DUT; and
initiate execution of a cross feature (CF) upon receipt of the NVMe AEN,
wherein the CF is a secondary function that is secondary to the particular function, and whereby the CF is executed while the DUT is performing the particular function, wherein the CF and the particular function overlap in execution.

2. The testing system of claim 1, wherein the driver is configured to initiate execution of the CF.

3. The testing system of claim 2, wherein the receiving occurs at the driver.

4. The testing system of claim 3, wherein the driver is further configured to send the NVMe AEN to a testing application of the testing system.

5. The testing system of claim 1, wherein the CF comprises read/write/format, compaction, error handling, or erase functions.

6. The testing system of claim 5, wherein the driver is configured to deliver the NVMe AER to the DUT.

7. The testing system of claim 1, further comprising a field programmable gate array (FPGA) test logic that initiate execution the CF.

8. The testing system of claim 1, wherein one or more processing devices are further configured to receive the AEN from the DUT without debug hardware.

9. A method of validating a memory device, comprising:
initializing a device under test (DUT);
snooping command completion notifications from the DUT;
delivering a non-volatile memory express (NVMe) asynchronous event request (AER) to a driver, wherein the NVMe AER includes instructions for the DUT to perform a particular function;
receiving an NVMe asynchronous event notification (AEN) from the DUT; and
initiating execution of a cross feature (CF) in response to the receiving, wherein the CF is a secondary function, and wherein the CF is executed while the DUT is performing the particular function, wherein the CF and the particular function overlap in execution.

10. The method of claim 9, wherein the snooping is performed by a field programmable gate array (FPGA) test logic.

11. The method of claim 10, wherein the FPGA test logic triggers execution of a cross feature (CF) by the DUT.

12. The method of claim 10, wherein the FPGA test logic initiates execution of a cross feature (CF) and informs a host that the CF has been triggered.

13. The method of claim 12, wherein the CF trigger occurs without message signaled interrupts (MSI) or MSIx handling at a host.

14. The method of claim 9, wherein the driver receives the NVMe AEN and provides the NVMe AEN to a host.

15. The method of claim 9, wherein the driver receives the NVMe AER and provides the NVMe AER to the DUT.

16. A testing device, comprising:
means to initialize a device under test (DUT) and initiate non-volatile memory express (NVMe) asynchronous event request (AER) for the DUT to perform a particular function; and
a driver configured to deliver the NVMe AER to the DUT, wherein either the driver or field programmable gate array (FPGA) test logic is configured to initiate execution of a cross feature (CF) by the DUT, wherein the initiation occurs prior to completion of the particular function, wherein the CF and the particular function overlap in execution.

17. The testing device of claim 16, wherein the means to initialize is configured to receive an NVMe asynchronous event notification (AEN) from the DUT and wherein the means to initialize is configured to receive the NVMe AEN after the initiation.

18. The testing device of claim 17, wherein the driver is further configured to deliver the NVMe AEN to the means to initialize.

* * * * *